(12) United States Patent
Lee (10) Patent No.: US 6,278,048 B1
(45) Date of Patent: Aug. 21, 2001

(54) PORTABLE KARAOKE DEVICE

(75) Inventor: Kyung Ho Lee, Shiheung-shi (KR)

(73) Assignee: Enter Technology Co., LTD, Seoul (KR)

( * ) Notice: Subject to any disclaimer, the term of this patent is extended or adjusted under 35 U.S.C. 154(b) by 0 days.

(21) Appl. No.: 09/705,756

(22) Filed: Nov. 6, 2000

(30) Foreign Application Priority Data

May 27, 2000 (KR) .................................................. 00-28847

(51) Int. Cl.[7] .............................. G09B 5/00; G09B 15/04; G10H 1/36
(52) U.S. Cl. ............................. 84/610; 84/634; 84/477 R; 434/307 A
(58) Field of Search ..................... 84/609–614, 634–638, 84/477 R, 478; 434/307 A (56) References Cited

U.S. PATENT DOCUMENTS

5,808,224   9/1998   Kato .

*Primary Examiner*—Stanley J. Witkowski
(74) *Attorney, Agent, or Firm*—Birch, Stewart, Kolasch & Birch, LLP (57) ABSTRACT

A portable karaoke device comprising an MP3 decoder for downloading an accompaniment of a desired tune, and an expandable sound module for storing the accompaniment downloaded by the MP3 decoder. A video signal is received from a video unit by radio and then utilized as a background picture. A video signal mixed with a lyrics caption is transmitted by radio to the video unit so that the user can view the background picture and lyrics. In addition to a main microphone over which the user sings while listening to an accompaniment sound, there is provided an auxiliary microphone for transmitting a signal by radio. The user can select and apply a next tune using the auxiliary microphone while singing over it. Therefore, with no necessity for replacing a sound module in which lyrics and accompaniments of newest songs are previously recorded and a video unit that provides a background picture, the user can simply and efficiently use the present device.

6 Claims, 10 Drawing Sheets

PORTABLE KARAOKE DEVICE

BACKGROUND OF THE INVENTION

1. Field of the Invention

The present invention relates in general to portable karaoke devices, and more particularly to a portable karaoke device which is capable of allowing the user to sing over a main microphone or auxiliary microphone and listen to his song mixed with an accompaniment sound through an audio unit while viewing a background picture with a lyrics caption through a video unit and of temporarily storing a tune downloaded through a moving picture experts group 2 (MPEG 2) layer 3 (MP3) technique in its internal sound module, so that the user can conveniently and simply use the device.

2. Description of the Prior Art

As well known in the art, accompaniment devices are adapted to store data about accompaniments of a large number of tunes in their internal memories. If the user selects a desired one of the tunes, then the associated accompaniment device outputs a sound of an accompaniment associated with the selected tune through a speaker at the same time that it inputs a song voice of the user through a microphone and outputs it through the speaker. As a result, people can simply practice singing with the accompaniment devices.

However, people have to purchase the above-mentioned accompaniment devices at a great expense and cannot use them at any places other than their installed places, because most of the accompaniment devices basically comprise monitor screens mounted integrally therewith and are usually installed within rooms. For these reasons, in order to use the accompaniment devices, people must search for places where the accompaniment devices have already been installed.

In order to overcome the above problems, there has been proposed a portable wireless accompaniment system comprising a plurality of expandable read only memory (ROM) packages for assigning numbers respectively to tunes desired by the user and storing accompaniments of the tunes in the form of digital signals.

In the proposed accompaniment system, a microprocessor is operated synchronously with an oscillation frequency from an oscillator and in response to a tune number and other items applied through a key matrix by the user.

The microprocessor is adapted to control the entire system operation according to routines stored in a program memory. Further, the microprocessor stores data related to a played tune in a memory and displays the current operation state on a display unit through a liquid crystal display (LCD) driver.

Further, the microprocessor controls a multiplexer, a D-type flip-flop, a ROM package and other components in the system in response to a tune selection through the key matrix by the user. A dual sound controller reproduces a stereo accompaniment sound, which is then amplified by an amplifier.

An echo generator is adapted to selectively output an echo sound of mechanical vibration waves. A tone controller controls a tone of the echo sound from the echo generator, which is then mixed with a stereo audio signal from a microphone terminal.

A gain controller controls a gain of the mixed signal and an audio amplifier amplifies the resultant audio signal together with the amplified stereo accompaniment sound from the above amplifier.

A radio frequency (RF) modulator modulates the amplified audio and accompaniment signals at a predetermined radio frequency. As a result, a synthetic melody signal is obtained by mixing the audio signal and accompaniment signal and then transmitted by radio to an external audio unit through an antenna.

As an alternative, there has been proposed a portable wireless video accompaniment system wherein lyrics caption data is outputted to a video unit together with a background video signal at the same time that an accompaniment sound of a selected tune is outputted to an audio unit while being mixed with a voice inputted through a microphone, thereby allowing the user to sing to the accompaniment sound while viewing lyrics on a background picture.

However, the above-mentioned conventional portable wireless accompaniment system and portable wireless video accompaniment system are advantageous in that they can be conveniently carried and used by the user, but have the following disadvantages. Firstly, the existing ROM packages must be replaced with new ones whenever new tunes are added. Secondly, the user cannot personally select a desired background picture and is thus liable to feel a repugnance toward the same background picture being continuously repeated. Thirdly, the user cannot select or reserve a next tune while singing over a microphone of the system body. As a result, it requires the user to spend extra time manipulating the controls to select or reserve a next tune.

SUMMARY OF THE INVENTION

Therefore, the present invention has been made in view of the above problems, and it is an object of the present invention to provide a portable wireless accompaniment system which is capable of allowing the user to sing over a main microphone or auxiliary microphone and listen to his song mixed with an accompaniment sound through an audio unit while viewing a background picture with a lyrics caption through a video unit and of temporarily storing a tune downloaded through an MP3 technique in its internal sound module, so that the user can conveniently and simply use the accompaniment system.

In a feature of the present invention, an MP3 decoder is provided to download an accompaniment of a desired tune and an expandable sound module is provided to store the accompaniment downloaded by the MP3 decoder.

A video signal is received from a video unit by radio and then utilized as a background picture. A video signal mixed with a lyrics caption is transmitted by radio to the video unit so that the user can view the background picture and lyrics.

In addition to a main microphone over which the user sings while listening to an accompaniment sound, there is provided an auxiliary microphone for transmitting a signal by radio. The user can select and apply a next tune using the auxiliary microphone while singing over it. Therefore, with no necessity for replacing a sound module in which lyrics and accompaniments of newest songs are previously recorded and a video unit that provides a background picture, the user can simply and efficiently use the present system.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
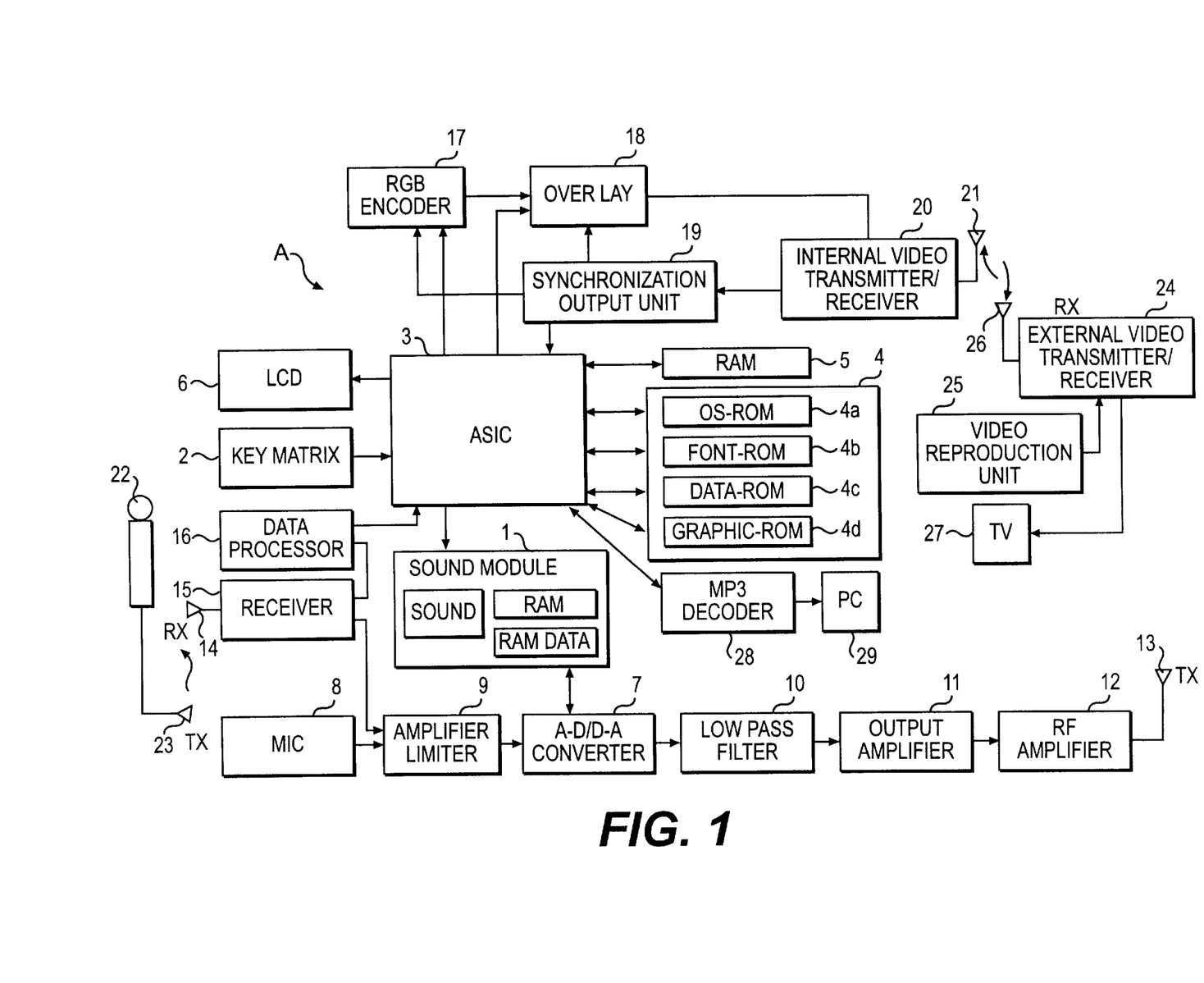
FIG. 1 is a block diagram schematically showing the entire construction of a portable karaoke device in accordance with the present invention.

FIG. 1 is a block diagram schematically showing the entire construction of a portable karaoke device in accordance with the present invention. As shown in this drawing, the karaoke device comprises an expandable sound module 1 for assigning arbitrary numbers respectively to given tunes and storing accompaniments of the tunes in the form of digital signals.

The karaoke device further comprises an application specific integrated circuit (ASIC) 3 including a microprocessor 31 (see FIG. 2) that is operated synchronously with an oscillation frequency from a crystal oscillator and in response to a tune number and other items applied through a key matrix 2 by the user.

The microprocessor 31 in the ASIC 3 is adapted to control the entire system operation according to routines stored in a storage unit 4. Further, the microprocessor 31 stores data related to a played tune in a random access memory (RAM) 5 and displays the current operation state on an LCD 6 through an LCD driver 34 (see FIG. 2).

The storage unit 4 may preferably include a program memory OS-ROM 4a for storing the routines for the control of the system operation, a character memory FONT-ROM 4b for storing and outputting characters in the form of digital signals, a tune memory DATA-ROM 4c for compressing, storing and outputting music data in a musical instrument digital interface (MIDI) format, and a video memory GRAPHIC-ROM 4d for storing and outputting a video signal in the form of a digital signal.

In response to a tune selection through the key matrix 2 by the user, the microprocessor 31 in the ASIC 3 outputs an accompaniment sound of a corresponding tune stored in the sound module 1 to an analog-digital/digital-analog (A-D/D-A) converter 7.

A main microphone 8 is adapted to input a user's song voice, convert it into an electrical signal and output the resultant audio signal. An amplifier/limiter circuit 9 functions to amplify the audio signal from the main microphone 8 and limit the amplitude of the amplified audio signal to a predetermined level. The amplifier/limiter circuit 9 provides its output audio signal via the A-D/D-A converter 7 to a low pass filter 10, which then passes only frequency band components lower than 20 KHz to remove sampling noise components higher than 20 KHz from the audio signal.

An output amplifier 11 amplifies data of the frequency band components lower than 20 KHz from the low pass filter 10 and transfers the resultant audio signal to an RF amplifier 12, which then modulates the audio signal into an RF signal and transmits the modulated RF signal to an external audio unit by radio through an antenna 13.

An auxiliary microphone 22 is provided separately from the system body A to transmit audio and data signals by radio to the body through a transmission antenna 23. A receiver 15 of the body A is adapted to receive the audio and data signals from the auxiliary microphone 22 through a reception antenna 14 and separate the received signals from each other.

The separated audio signal from the receiver 15 is transferred to the amplifier/limiter circuit 9 which also receives the audio signal from the main microphone 8. Then, the amplifier/limiter circuit 9 selectively amplifies the audio signal from the receiver 15 and the audio signal from the main microphone 8, and limits the amplitude of the amplified audio signal to the predetermined level as stated previously.

A data processor 16 is adapted to convert the separated data signal from the receiver 15 into a digital signal and transfer the converted digital signal to the ASIC 3. Such a digital signal to the ASIC 3 may preferably include a signal associated with a tune or volume that the user selects or adjusts using the auxiliary microphone 22.

A red (R) green (G) blue (B) encoder 17 is connected to the ASIC 3 to generate a background video signal on the basis of digital R, G and B signals, a digital color carrier signal and digital horizontal and vertical synchronization signals from the ASIC 3.

An overlay circuit 18 is connected to the ASIC 3 to mix a caption video signal from the ASIC 3 with the background video signal from the RGB encoder 17 in an overlay manner to express them as one image.

A synchronization output unit 19 is adapted to selectively output a main clock signal of 21.47727 MHz or 22.168095 MHz according to a National Television System Committee (NTSC) or Phase Alternation Line (PAL) broadcasting system in response to an external synchronization signal.

An internal video transmitter/receiver circuit 20 is adapted to receive a caption/background-mixed video signal from the overlay circuit 18 and transmit the received video signal as an internal video signal through an internal video transmission/reception antenna 21 at a radio frequency controlled by the user. Further, the internal video transmitter/receiver circuit 20 receives a radio frequency signal through the internal video transmission/reception antenna 21, converts the received radio frequency signal into an intermediate frequency signal, detects an external video signal from the converted intermediate frequency signal and outputs the detected video signal to the ASIC 3.

An external video transmitter/receiver circuit 24 is adapted to transmit or receive a radio frequency signal to or from the internal video transmission/reception antenna 21. The external video transmitter/receiver circuit 24 receives a background video signal from a video reproduction unit 25 such as a VCD, LDP or VCR and transmits the received video signal as the external video signal to the internal video transmitter/receiver circuit 20 through an external video transmission/reception antenna 26 at a radio frequency controlled by a frequency controller. Further, the external video transmitter/receiver circuit 24 receives the radio frequency signal from the internal video transmitter/receiver circuit 20 through the external video transmission/reception antenna 26, converts the received radio frequency signal into an intermediate frequency signal, detects the internal video signal from the converted intermediate frequency signal and outputs the detected video signal to a television (TV) 27.

An MP3 decoder 28 is connected to the ASIC 3 and selectively to a personal computer (PC) 29 to download data about an accompaniment sound and lyrics of a new tune and store the downloaded data in the sound module 1 or other storage unit.

Although not shown, a power supply is provided to supply a direct current (DC) voltage from a battery in the karaoke device or an external DC voltage as a system drive voltage.

Figure 2:
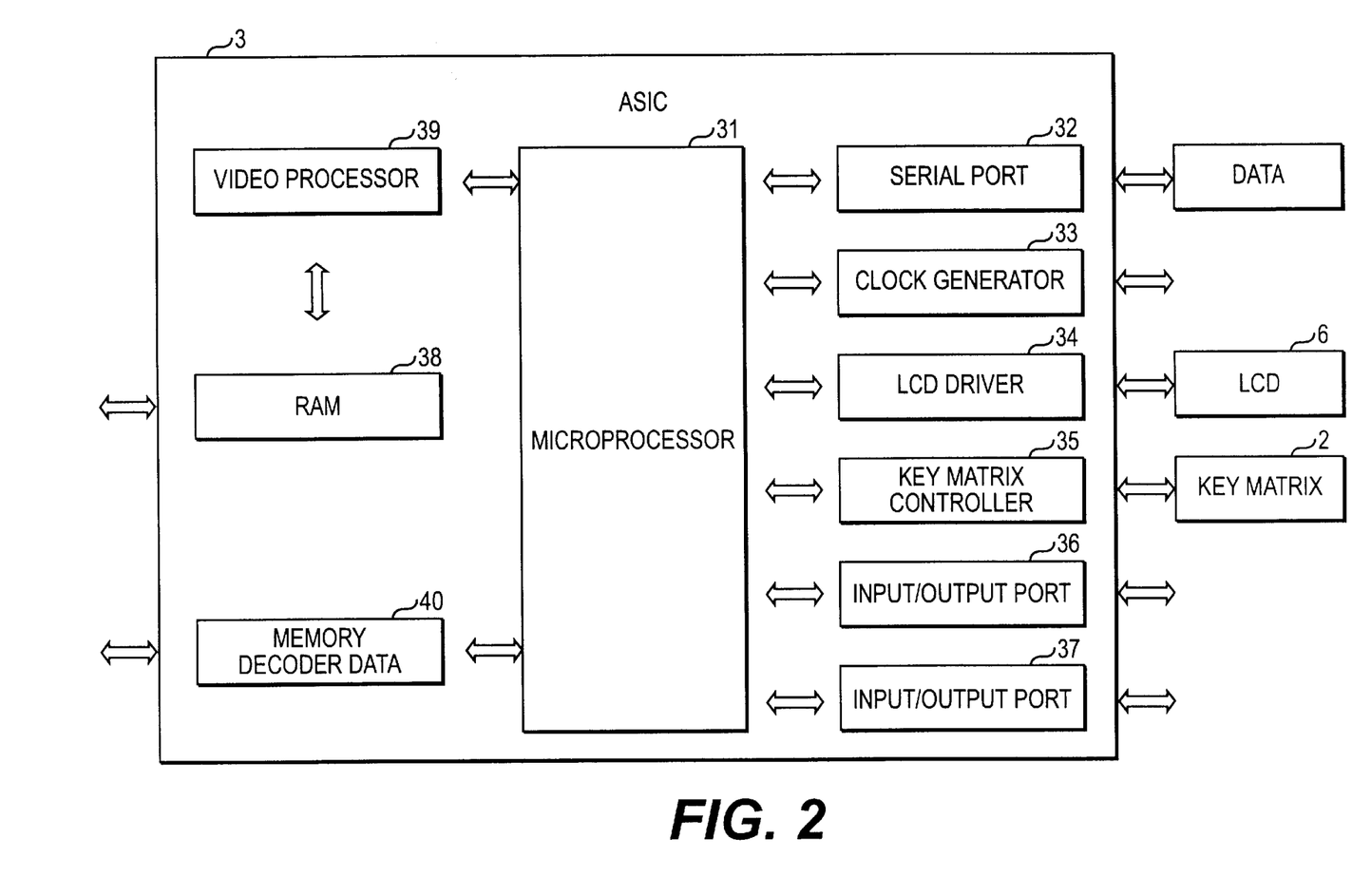
FIG. 2 is a block diagram schematically showing the construction of an application specific integrated circuit in FIG. 1.

FIG. 2 is a block diagram schematically showing the construction of the ASIC 3 in FIG. 1. As shown in this drawing, the ASIC 3 includes the microprocessor 31 for controlling the entire system operation.

A serial port 32 is adapted to input and output data under the control of the microprocessor 31.

A clock generator 33 functions to generate a synchronization signal for system synchronization and other clock signals under the control of the microprocessor 31.

The LCD driver 34 displays the current operation state including a tune number selected by the user on the LCD 6 under the control of the microprocessor 31.

The key matrix 2 includes a tune selection button having numeral keys of 0 to 9 for selecting a tune number desired by the user, a tempo adjustment button for adjusting a tempo of a played tune, a tone adjustment button for adjusting a tone of the played tune, up/down buttons for adjusting the tempo and tone of the played tune to levels desired by the user after the tempo and tone adjustment buttons are pushed by the user, a reset button for returning the played tune to its normal state when the tune is abnormally played due to a glitch in play or a mistake in button operation by the user, and a continuous play button for playing tunes continuously with no separate selection. The key matrix 2 further includes a start button for starting a tune selected by the user, and a stop button for stopping the play of the selected tune. The user can listen to an accompaniment of a desired tune by pushing the start button and change the played tune to a different one or select it again by pushing the stop button. The key matrix 2 further includes a power button for powering on the system. A key matrix controller 35 is adapted to transfer items selected through the key matrix 2 by the user to the microprocessor 31.

Input/output ports 36 and 37 function to input and output data under the control of the microprocessor 31.

A RAM 38 is adapted to temporarily store a video signal from the video reproduction unit 25, received through the internal video transmission/reception antenna 21, under the control of the microprocessor 31.

A video processor 39 processes the video signal stored in the RAM 38 under the control of the microprocessor 31 to generate a background image.

A memory decoder 40 performs read/write operations under the control of the microprocessor 31 to read and write data from/into the RAM 5 and the storage unit 4 provided with the program memory OS-ROM 4a for storing the routines for the control of the system operation, the character memory FONT-ROM 4b for storing and outputting characters in the form of digital signals, the tune memory DATA-ROM 4c for compressing, storing and outputting music data in a MIDI format and the video memory GRAPHIC-ROM 4d for storing and outputting a video signal in the form of a digital signal, as mentioned above.

Figure 3:
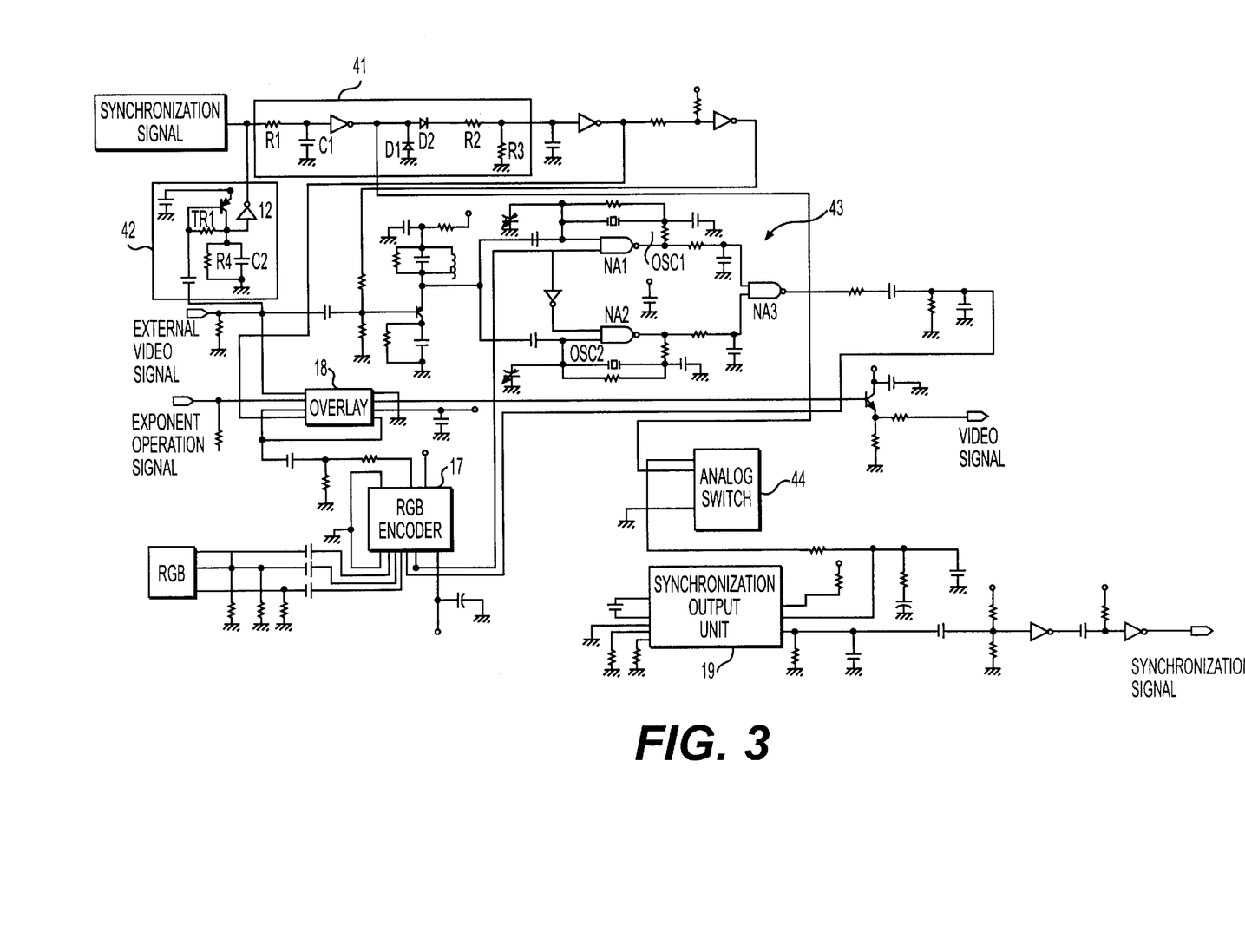
FIG. 3 is a circuit diagram showing the construction of a video signal processing circuit including an RGB encoder, overlay circuit and synchronization output unit in accordance with the present invention.

FIG. 3 is a circuit diagram showing the construction of a video signal processing circuit including the RGB encoder 17, overlay circuit 18 and synchronization output unit 19 in accordance with the present invention.

A synchronization detector 42 is provided to detect the external synchronization signal from the external video signal from the external video transmitter/receiver circuit 24. To this end, the synchronization detector 42 includes a transistor TR1, inverter I2, resistor R4 and capacitor C2. A synchronization discriminator 41 is adapted to compare a synchronization signal from the ASIC 3 with the external synchronization signal detected by the synchronization detector 42. To this end, the synchronization discriminator 41 includes an inverter I1, diodes D1 and D2, resistors R1, R2 and R3 and a capacitor C1.

The overlay circuit 18 includes a video switch for receiving the external video signal from the external video transmitter/receiver circuit 24 or the video signal from the RGB encoder 17 as a background video signal and the caption video signal from the ASIC 3 and alternately selecting the received video signals to mix them in an overlay manner and express them as one image.

The RGB encoder 17 is adapted to generate the background video signal on the basis of the digital R, G and B signals, digital color carrier signal and digital horizontal and vertical synchronization signals from the ASIC 3 and output the generated video signal to the overlay circuit 18.

A clock generator 43 is adapted to generate a clock signal associated with the external video signal from the external video transmitter/receiver circuit 24 according to whether the external video signal is an NTSC-type broadcasting signal of 3.59745 MHz or a PAL-type broadcasting signal of 4.447619 MHz. To this end, the clock generator 43 includes oscillators OSC1 and OSC2 and NAND gates N1, N2 and N3.

An analog switch 44 is adapted to select one of PAL, NTSC, external video and internal video modes under the control of the ASIC based on a user's selection. The synchronization output unit 19 is adapted to output a synchronization signal to the ASIC 3 according to the mode selected by the analog switch 44.

Figure 4:
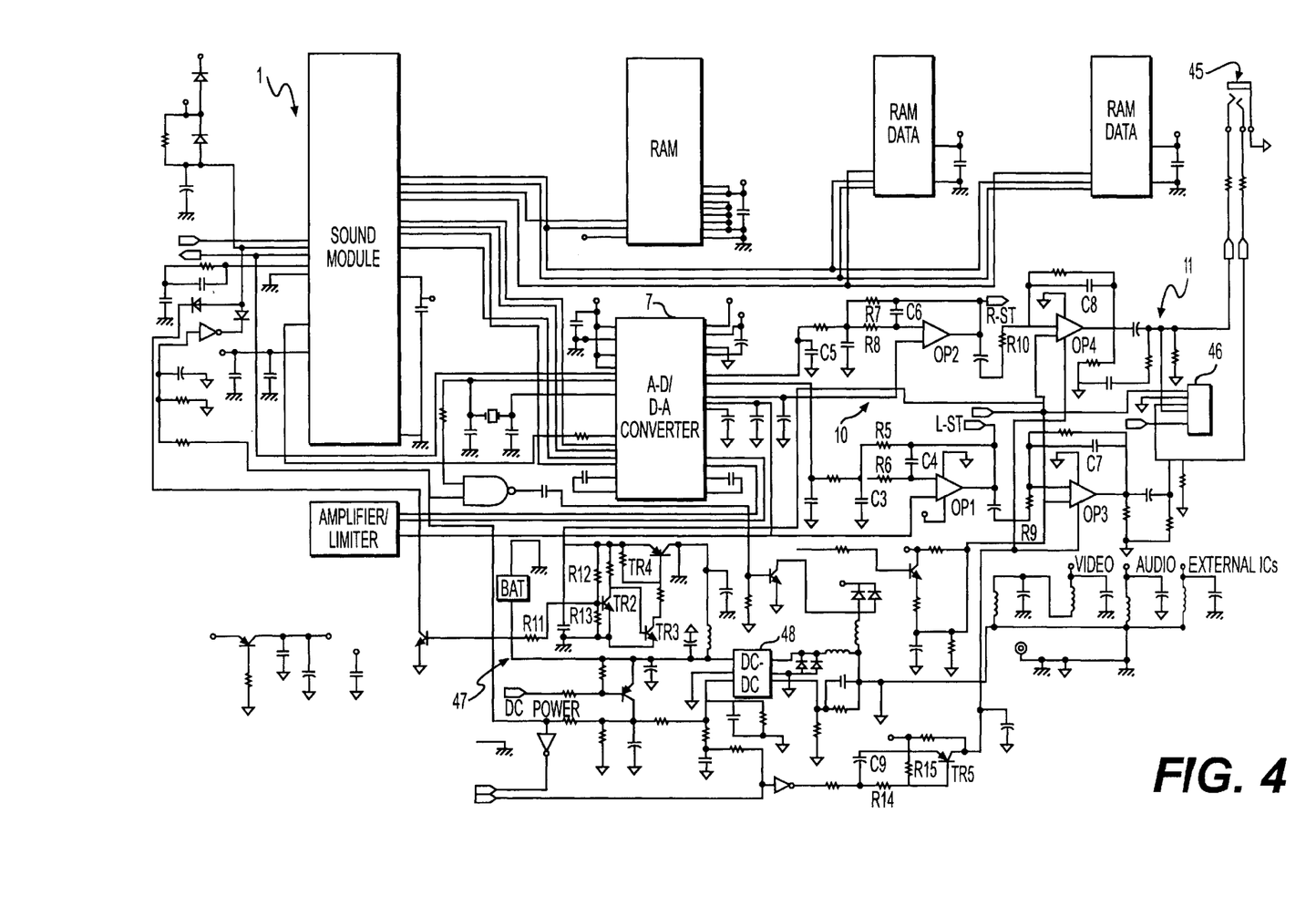
FIG. 4 is a circuit diagram showing the construction of an accompaniment sound output circuit in accordance with the present invention.

FIG. 4 is a circuit diagram showing the construction of an accompaniment sound output circuit in accordance with the present invention.

The sound module 1 is adapted to output an accompaniment sound of a selected tune stored therein to the A-D/D-A converter 7 under the control of the microprocessor 31.

The amplifier/limiter circuit 9 is adapted to amplify an audio signal from the main microphone 8 or auxiliary microphone 22 corresponding to a user's song voice and limit the amplitude of the amplified audio signal to a predetermined level. The A-D/D-A converter 7 functions to separate an output audio signal from the amplifier/limiter circuit 9 into a left stereo signal L-ST and a right stereo signal R-ST.

The low pass filter 10 includes a first filtering part for passing only frequency band components lower than 20 KHz to remove sampling noise components higher than 20

KHz from the left stereo signal L-ST from the A-D/D-A converter 7, and a second filtering part for passing only frequency band components lower than 20 KHz to remove sampling noise components higher than 20 KHz from the right stereo signal R-ST from the A-D/D-A converter 7. The first filtering part is provided with resistors R5 and R6, capacitors C3 and C4 and an operational amplifier OPI, and the second filtering part is provided with resistors R7 and R8, capacitors C5 and C6 and an operational amplifier OP2.

The output amplifier 11 includes a first amplification part for amplifying the sampling noise-removed left stereo signal from the low pass filter 10 to a predetermined level and outputting the amplified left stereo signal to a connector 46, and a second amplification part for amplifying the sampling noise-removed right stereo signal from the low pass filter 10 to a predetermined level and outputting the amplified right stereo signal to the connector 46. The first amplification part is provided with a resistor R9, a capacitor C7 and a negative feedback operational amplifier OP3, and the second amplification part is provided with a resistor R10, a capacitor C8 and a negative feedback operational amplifier OP4. The connector 46 is coupled with a headphone output unit 45 via a cable.

A high-voltage breaker 47 acts to break an external DC voltage or a battery DC voltage when the DC voltage is inverted in polarity or has an overvoltage level of 10V or more. To this end, the high-voltage breaker 47 includes a bias resistor R11, voltage-dividing resistors R12 and R13 and transistors TR2, TR3 and TR4.

A DC-DC converter 48 is provided to convert the DC voltage passed by the high-voltage breaker 47 into a constant voltage of 4V and supply the converted constant voltage to the ASIC 3 and other internal components in the system.

A delay circuit 49 is adapted to delay the supply of the external DC voltage or battery DC voltage for a predetermined period of time to prevent a surge noise component from being applied to the left and right stereo signals at the initial moment that the DC voltage is supplied. To this end, the delay circuit 49 includes resistors R14 and R15, a capacitor C9 and a transistor TR5.

Figure 5:
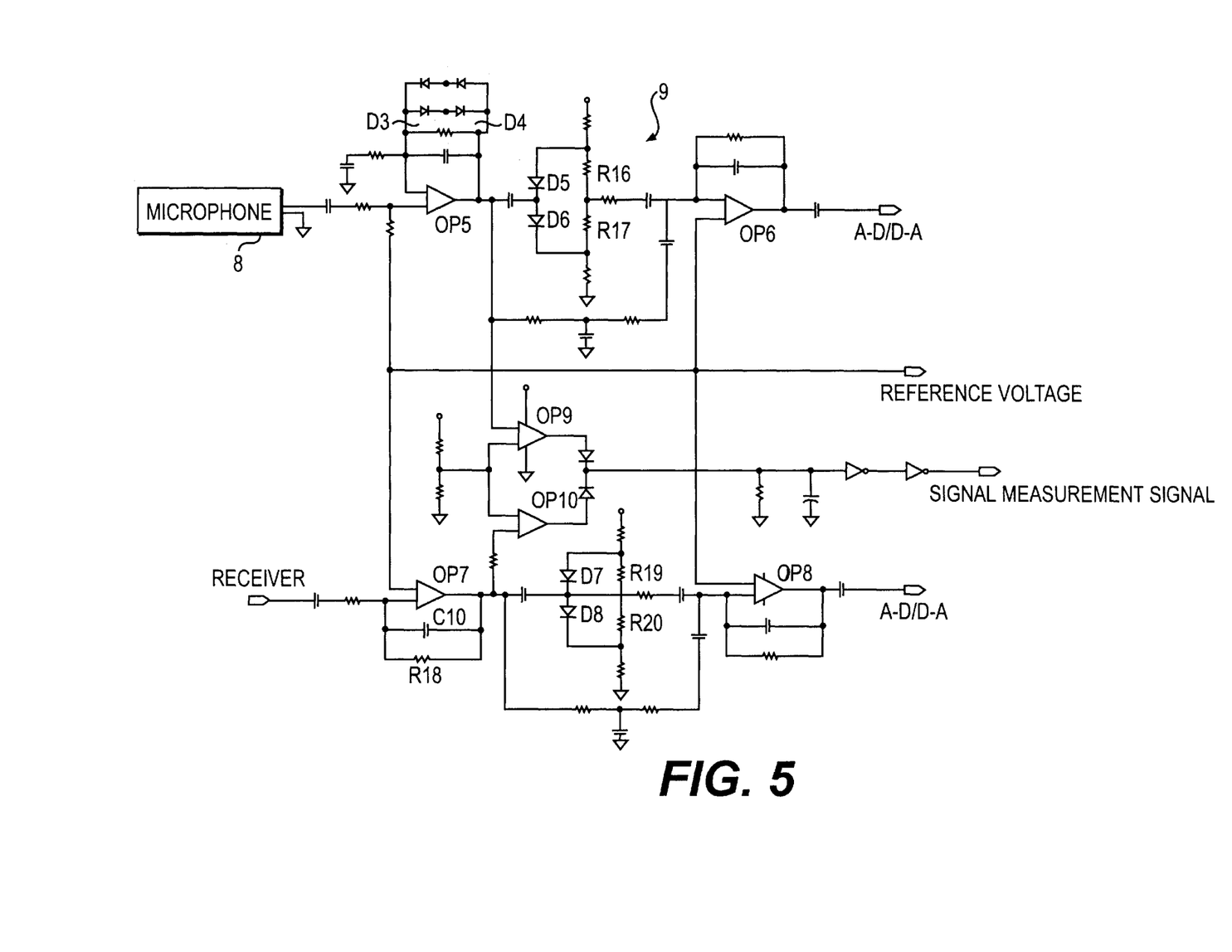
FIG. 5 is a circuit diagram showing the construction of an amplifier/limiter circuit in FIG. 1.

FIG. 5 is a circuit diagram showing the construction of the amplifier/limiter circuit 9 in FIG. 1.

The amplifier/limiter circuit 9 includes an operational amplifier OP5 for receiving and amplifying an audio signal from the main microphone 8, a first noise limiter for limiting a noise component of the audio signal amplified by the operational amplifier OP5 and feeding the resultant audio signal back to the amplifier OP5, and a first noise attenuator for attenuating a noise component from the audio signal amplified by the operational amplifier OP5 and transferring the resultant audio signal to the A-D/D-A converter 7. The first noise limiter is provided with diodes D3 and D4, and the first noise attenuator is provided with diodes D5 and D6, resistors R16 and R17 and an operational amplifier OP6.

The amplifier/limiter circuit 9 further includes an operational amplifier OP7 for receiving an audio signal from the auxiliary microphone 22 through the receiver 15 and amplifying the received audio signal, a second noise limiter for limiting a noise component of the audio signal amplified by the operational amplifier OP7 and feeding the resultant audio signal back to the amplifier OP7, and a second noise attenuator for attenuating a noise component from the audio signal amplified by the operational amplifier OP7 and transferring the resultant audio signal to the A-D/D-A converter 7. The second noise limiter is provided with a resistor R18 and a capacitor C10, and the second noise attenuator is provided with diodes D7 and D8, resistors R19 and R20 and an operational amplifier OP8.

The amplifier/limiter circuit 9 further includes a signal measurement part for determining whether each of the audio signals from the first and second noise limiters has been inputted from which one of the main and auxiliary microphones 8 and 22 and outputting a signal measurement signal as a result of the determination. To this end, the signal measurement part includes two operational amplifiers OP9 and OP10.

Figure 6:
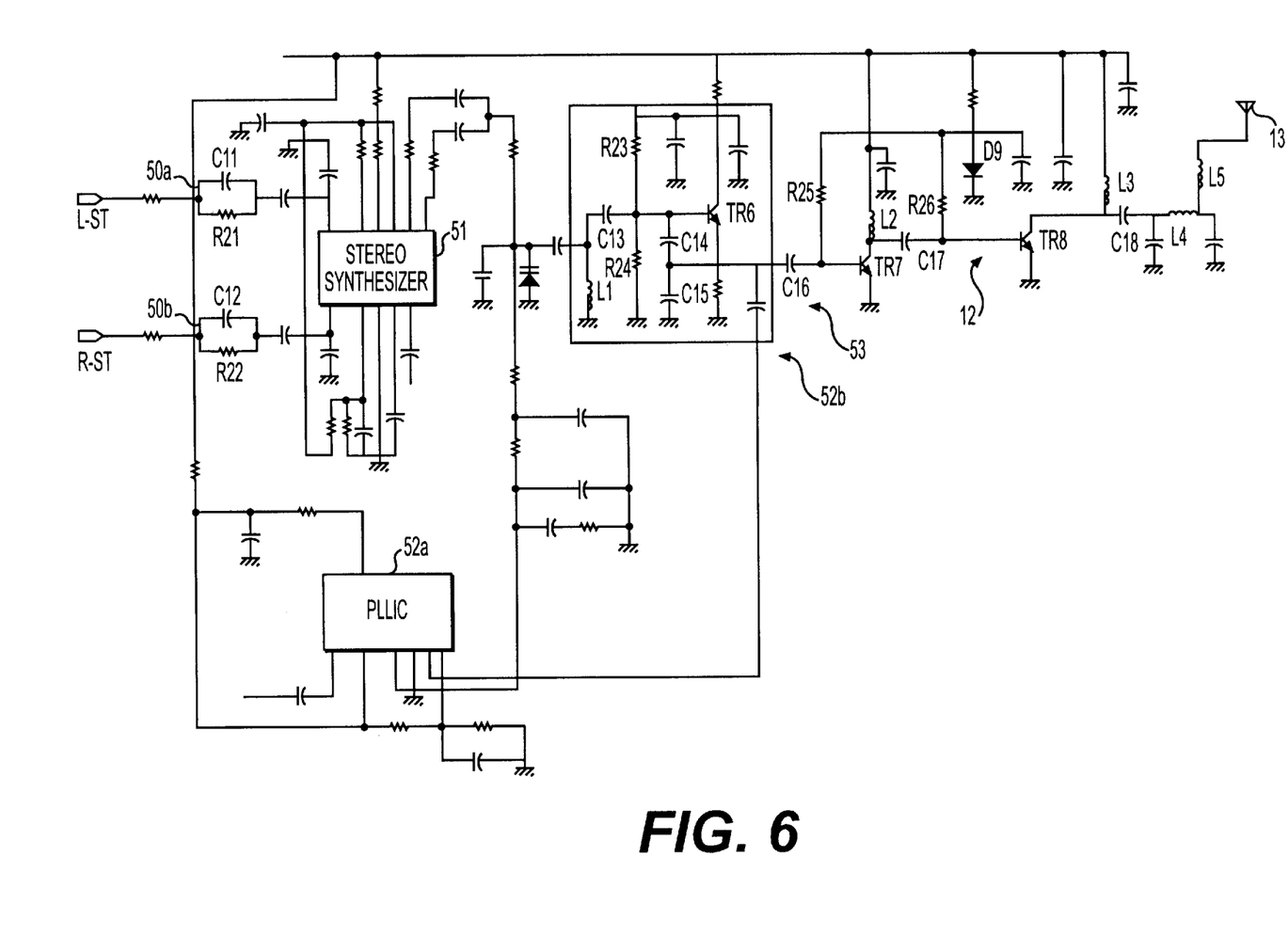
FIG. 6 is a circuit diagram showing the constructions of an output amplifier and radio frequency amplifier in FIG. 1.

FIG. 6 is a circuit diagram showing the constructions of the output amplifier 11 and RF amplifier 12 in FIG. 1.

The output amplifier 11 includes a first pre-emphasis circuit 50a for enhancing a signal-to-noise (S/N) ratio of the left stereo signal L-ST from the low pass filter 10, a second pre-emphasis circuit 50b for enhancing an S/N ratio of the right stereo signal R-ST from the low pass filter 10, and a stereo synthesizer 51 for alternately switching the S/N ratio-enhanced left and right stereo signals L-ST and R-ST from the first and second pre-emphasis circuits 50a and 50b to synthesize them into one audio signal. The first pre-emphasis circuit 50a is provided with a resistor R21 and a capacitor C11, and the second pre-emphasis circuit 50b is provided with a resistor R22 and a capacitor C12.

The output amplifier 11 further includes a phase locked loop (PLL) circuit 52a for generating a high-frequency signal, and a frequency modulation (FM) circuit 52b for modulating the audio signal from the stereo synthesizer 51 at a frequency obtained by wired-ORing it with the high-frequency signal from the PLL circuit 52a. The FM circuit 52b is provided with resistors R23 and R24, capacitors C13, C14 and C15, a transistor TR6 and a coil L1.

The output amplifier 11 further includes an exciter 53 for amplifying the FM signal from the FM circuit 52b to remove an interference between oscillation and output stages. The exciter 53 is provided with a capacitor C16, a resistor R25, a transistor TR7 and a coil L2.

The RF amplifier 12 is adapted to amplify power of the FM signal amplified by the exciter 53 and transmit the resultant RF signal externally through the antenna 13. To this end, the RF amplifier 12 includes a diode D9, a resistor R26, capacitors C17 and C18, a transistor TR8 and coils L3, L4 and L5.

Figure 7:
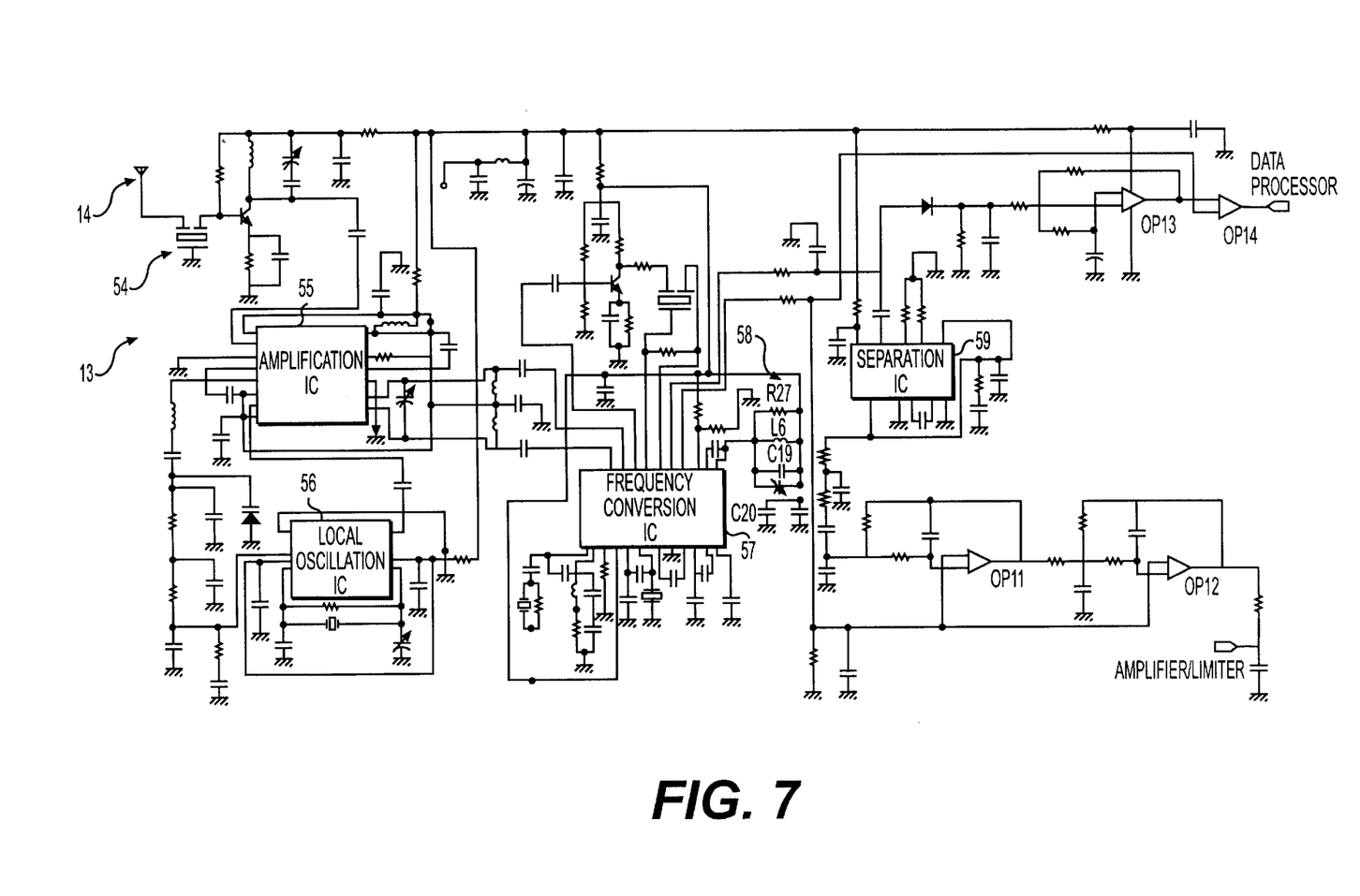
FIG. 7 is a circuit diagram showing the construction of a receiver in FIG. 1.

FIG. 7 is a circuit diagram showing the construction of the receiver 15 in FIG. 1.

The receiver 15 includes a filter 54 for receiving the audio and data signals from the auxiliary microphone through the reception antenna 14 and filtering the received signals, an amplification IC 55 for amplifying an output signal from the filter 54 to compensate it for a transmission loss, and a local oscillation IC 56 for generating a local oscillating frequency.

A frequency conversion IC 57 converts an output signal from the amplification IC 55 into an intermediate frequency signal of 10.7 MHz by wired-ORing it with the local oscillating frequency from the local oscillation IC 56. A demodulator 58 is adapted to demodulate the intermediate frequency signal from the frequency conversion IC 57 to separate the original signal from a carrier. To this end, the demodulator 58 includes a resistor R27, a coil L6 and capacitors C19 and C20.

A separation IC 59 separates the original signal from the demodulator 58 into the original audio signal and data signal. A pair of operational amplifiers OP11 and OP12 are adapted to amplify the original audio signal from the separation IC 59 and transfer the amplified audio signal to the amplifier/limiter circuit 9, and a pair of operational amplifiers OP11 and OP12 are adapted to amplify the original data signal from the separation IC 59 and transfer the amplified data signal to the microprocessor 31 in the ASIC 3 via the data processor 16.

Figure 8:
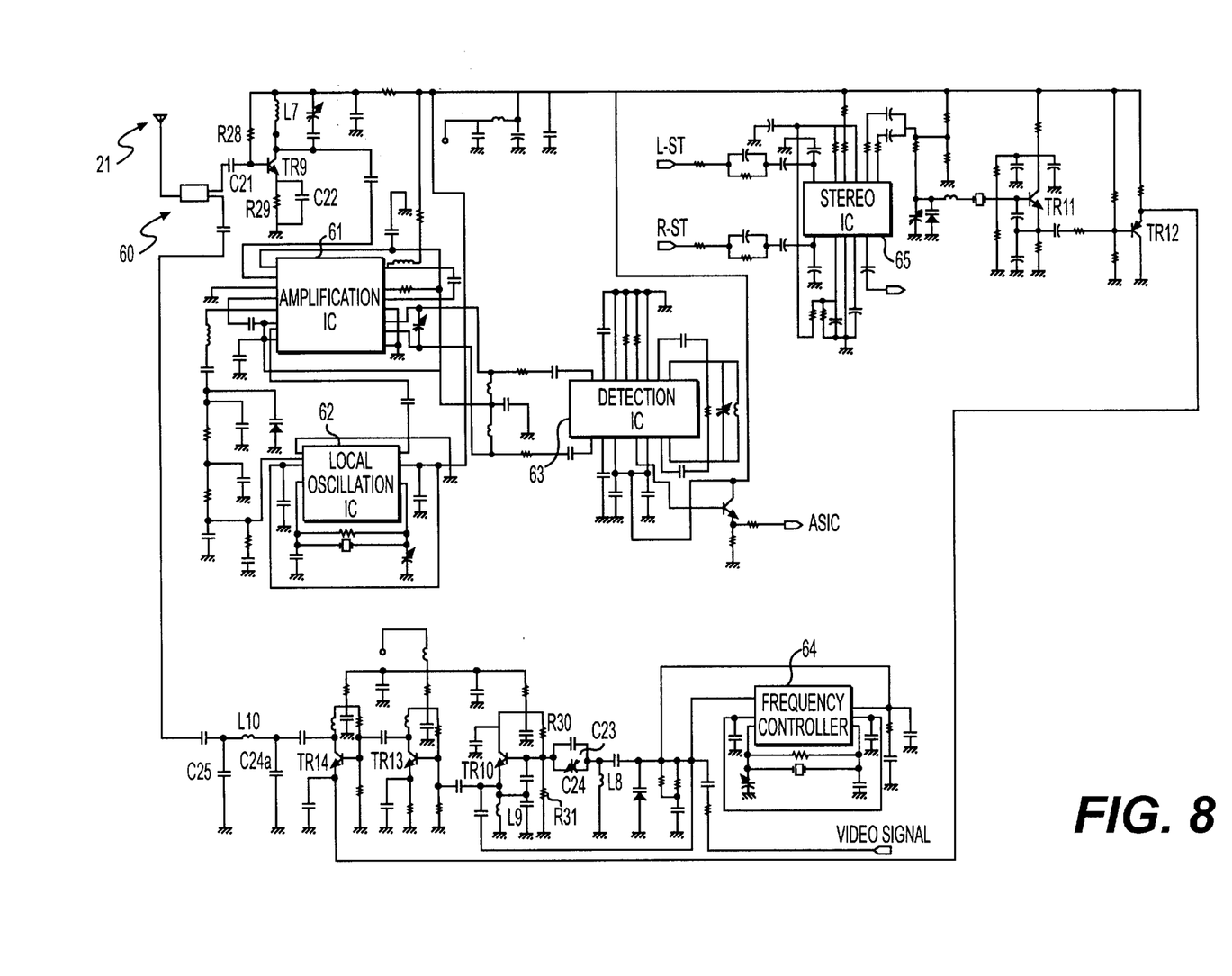
FIG. 8 is a circuit diagram showing the construction of an internal video transmitter/receiver circuit in FIG. 1.

FIG. 8 is a circuit diagram showing the construction of the internal video transmitter/receiver circuit 20 in FIG. 1.

The internal video transmitter/receiver circuit 20 includes a transmission/reception IC 60 for receiving the radio frequency signal from the external video transmitter/receiver circuit 24 through the internal video transmission/reception antenna 21. An amplification circuit functions to amplify the radio frequency signal received by the transmission/reception IC 60. To this end, the amplification circuit is provided with resistors R28 and R29, capacitors C21 and C22, a coil L7 and a transistor TR9. An amplification IC 61 amplifies an output signal from the amplification circuit to compensate it for a transmission loss, and a local oscillation IC 62 generates a local oscillating frequency.

The internal video transmitter/receiver circuit 20 further includes a detection IC 63 for converting an output signal from the amplification IC 61 into an intermediate frequency signal by wired-ORing it with the local oscillating frequency from the local oscillation IC 62, detecting the external video signal from the converted intermediate frequency signal and transferring the detected video signal to the ASIC 3.

A frequency generator is adapted to generate a frequency of the caption/background-mixed video signal from the overlay circuit 18 under the control of a frequency controller 64. To this end, the frequency generator includes resistors R30 and R31, coils L8 and L9, capacitors C23 and C24 and a transistor TR10.

A stereo IC 65 mixes the separated left and right stereo signals L-ST and R-ST from the A-D/D-A converter 7 into a stereo audio signal. A pair of transistors TR11 and TR12 are adapted to two-step amplify the stereo audio signal from the stereo IC 65, and a pair of transistors TR13 and TR14 are adapted to two-step amplify the caption/background-mixed video signal with the frequency generated by the frequency generator and wired-OR the amplified video signal with the stereo audio signal amplified by the transistors TR11 and TR12 to mix them.

The internal video transmitter/receiver circuit 20 further includes a filtering circuit for filtering the stereo audio/video-mixed signal from the transistors TR13 and TR14 and transmitting the resultant radio frequency signal through the internal video transmission/reception antenna 21. The filtering circuit is provided with capacitors C24a and C25 and a coil L10.

Figure 9:
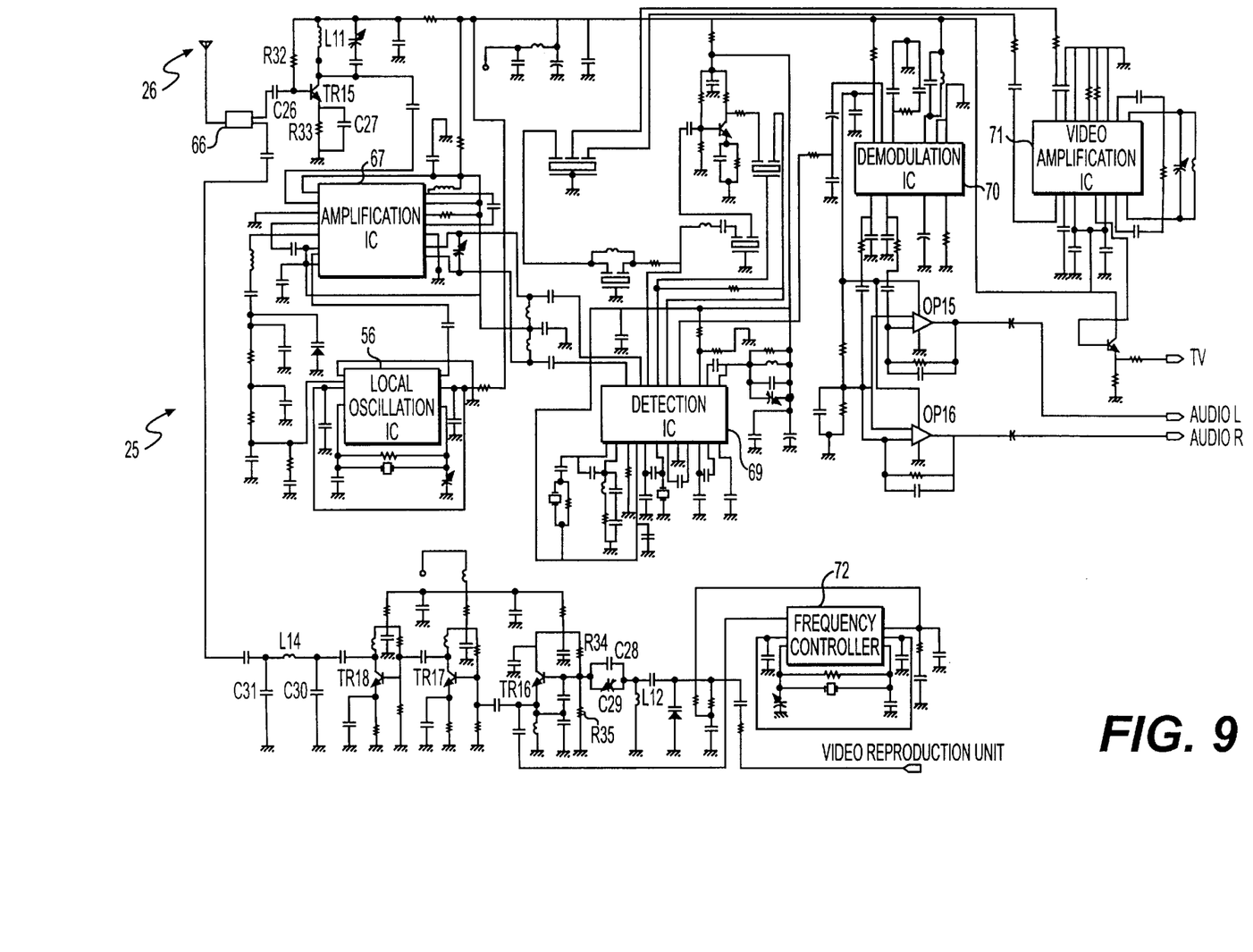
FIG. 9 is a circuit diagram showing the construction of an external video transmitter/receiver circuit in FIG. 1.

FIG. 9 is a circuit diagram showing the construction of the external video transmitter/receiver circuit 24 in FIG. 1.

The external video transmitter/receiver circuit 24 includes a transmission/reception IC 66 for receiving the radio frequency signal from the internal video transmitter/receiver circuit 20 through the external video transmission/reception antenna 26, an amplification circuit for amplifying the radio frequency signal received by the transmission/reception IC 66, an amplification IC 67 for amplifying an output signal from the amplification circuit to compensate it for a transmission loss, and a local oscillation IC 68 for generating a local oscillating frequency. The amplification circuit is provided with resistors R32 and R33, capacitors C26 and C27, a coil L11 and a transistor TR15.

A detection IC 69 is adapted to convert an output signal from the amplification IC 67 into an intermediate frequency signal by wired-ORing it with the local oscillating frequency from the local oscillation IC 68 and detect a stereo audio/video-mixed signal from the converted intermediate frequency signal. A demodulation IC 70 functions to demodulate the stereo audio/video-mixed signal detected by the detection IC 69 to separate it into a stereo audio signal and a video signal.

The video transmitter/receiver circuit 24 further includes an operational amplifier OP15 for amplifying a left stereo signal of the stereo audio signal from the demodulation IC 70 and outputting the amplified left stereo signal to the TV 27 through a left audio output terminal AUDIO L, and an operational amplifier OP16 for amplifying a right stereo signal of the stereo audio signal from the demodulation IC 70 and outputting the amplified right stereo signal to the TV 27 through a right audio output terminal AUDIO R.

A video amplification IC 71 is adapted to amplify the video signal from the demodulation IC 70 and output the amplified video signal to the TV 27 through a video output terminal VIDEO OUT.

A frequency generator functions to generate a frequency of the background video signal from the video reproduction unit 25 under the control of a frequency controller 72. To this end, the frequency generator includes resistors R34 and R35, coils L12 and L13, capacitors C28 and C29 and a transistor TR16.

The video transmitter/receiver circuit 20 further includes a pair of transistors TR17 and TR18 for two-step amplifying the video signal with the frequency generated by the frequency generator, and a filtering circuit for filtering the video signal amplified by the transistors TR17 and TR18 and transmitting the resultant radio frequency signal through the external video transmission/reception antenna 26. The filtering circuit is provided with capacitors C30 and C31 and a coil L14.

Figure 10:
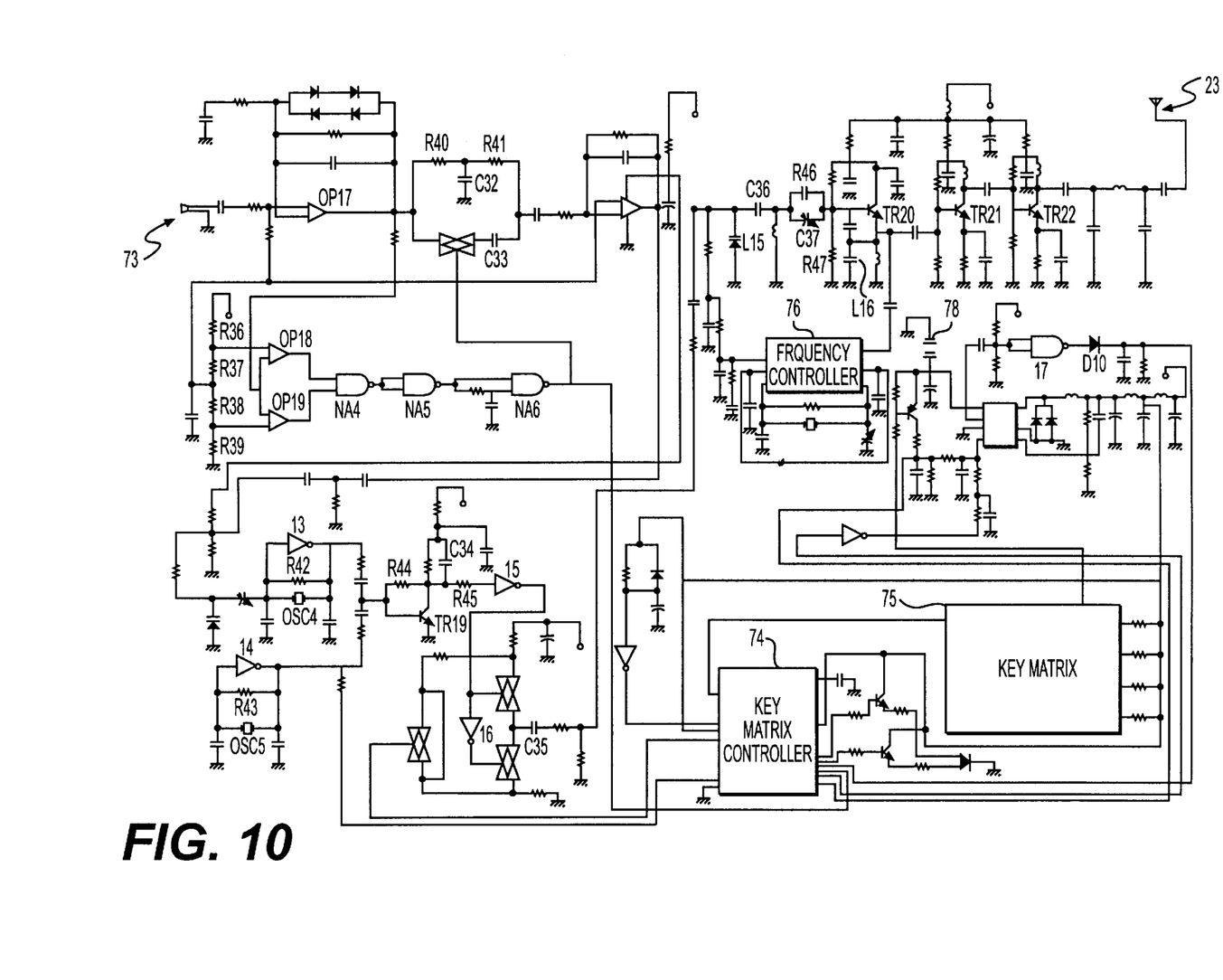
FIG. 10 is a circuit diagram showing the construction of an auxiliary microphone in FIG. 1.

FIG. 10 is a circuit diagram showing the construction of the auxiliary microphone 22 in FIG. 1.

The auxiliary microphone 22 includes an input unit 73 for inputting a user's song voice and outputting a corresponding audio signal, an operational amplifier OP17 for amplifying the audio signal from the input unit 73, a noise removing circuit for removing a noise component from the audio signal amplified by the operation amplifier OP17, and a first amplification circuit for amplifying the noise-removed audio signal from the noise removing circuit. The noise removing circuit is provided with operational amplifiers OP18 and OP19, NAND gates NA4, NA5 and NA6, resistors R36–R41 and capacitors C32 and C33, and the first amplification circuit is provided with an inverter I3, a resistor R42 and an oscillator OSC4.

The auxiliary microphone 22 further includes a key matrix 75 having a tune selection button having numeral keys of 0 to 9 for selecting a tune number desired by the user, up/down buttons for adjusting a tempo and tone of a played tune to levels desired by the user, a reset button for returning the played tune to its normal state when the tune is abnormally played due to a glitch in play or a mistake in button operation by the user, a continuous play button for playing tunes continuously with no separate selection, a start button for starting a tune selected by the user, and a stop button for stopping the play of the selected tune. The user can listen to an accompaniment of a desired tune by pushing the start button and change the played tune to a different one or select it again by pushing the stop button. The key matrix 75 further has a power button for supplying power from a battery 78 contained in the auxiliary microphone 22 to components in the microphone. A key matrix controller 74 acts to recognize an item selected through the key matrix 75 by the user and generate a corresponding data signal, and a second amplification circuit functions to amplify the data signal from the key matrix controller 74. To this end, the second amplification circuit is provided with an inverter I4, a resistor R43 and an oscillator OSC5.

An audio/data mixer is adapted to mix the audio signal and data signal amplified respectively by the first and second amplification circuits. To this end, the audio/data mixer includes resistors R44 and R45, a transistor TR19, capacitors C34 and C35 and inverters I5 and I6.

A frequency generator is adapted to generate a frequency of the audio/data-mixed signal from the audio/data mixer under the control of a frequency controller 76. To this end, the frequency generator includes resistors R46 and R47, coils L15 and L16, capacitors C36 and C37 and a transistor TR20. A pair of transistors TR21 and TR22 are adapted to two-step amplify the audio/data-mixed signal with the frequency generated by the frequency generator and transmit the resultant radio frequency signal through the transmission antenna 23.

The auxiliary microphone 22 further includes a power supply for supplying the power from the battery 78 as operating power to the above components in the microphone. The power supply includes a low power alarm circuit composed of an inverter I7 and a diode D10.

As apparent from the above description, the present invention provides a portable karaoke device comprising an MP3 decoder for downloading an accompaniment of a desired tune, and an expandable sound module for storing the accompaniment downloaded by the MP3 decoder.

A video signal is received from a video unit by radio and then utilized as a background picture. A video signal mixed with a lyrics caption is transmitted by radio to the video unit so that the user can view the background picture and lyrics.

In addition to a main microphone over which the user sings while listening to an accompaniment sound, there is provided an auxiliary microphone for transmitting a signal by radio. The user can select and apply a next tune using the auxiliary microphone while singing over it. Therefore, with no necessity for replacing a sound module in which lyrics and accompaniments of newest songs are previously recorded and a video unit that provides a background picture, the user can simply and efficiently use the present device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A portable karaoke device comprising a sound module for storing accompaniments of tunes in the form of digital signals and outputting a corresponding one of the stored accompaniments to an analog-digital/digital-analog converter in response to a tune selection by the user, a main microphone for inputting a user's song voice, converting it into an electrical signal and outputting the resultant audio signal, amplifier/limiter means for amplifying the audio signal from said main microphone, limiting the amplitude of the amplified audio signal to a predetermined level and outputting the resultant audio signal to said analog-digital/digital-analog converter, a low pass filter for low pass filtering an output signal from said analog-digital/digital-analog converter, an output amplifier for amplifying an output signal from said low pass filter, and a radio frequency amplifier for modulating an output signal from said output amplifier into a radio frequency signal and transmitting the modulated signal to an external audio unit by radio through an antenna, wherein said portable karaoke device further comprises:

an auxiliary microphone provided separately from the body of said device for transmitting audio and data signals by radio to the body through a transmission antenna;

receiver means installed in the body of said device for receiving said audio and data signals from said auxiliary microphone through a reception antenna and separating the received signals from each other;

said amplifier/limiter means selectively amplifying the separated audio signal from said receiver means and said audio signal from said main microphone and limiting the amplitude of the amplified audio signal to said predetermined level;

an application specific integrated circuit for controlling the entire operation of said device;

a data processor for converting the separated data signal from said receiver means into a digital signal and transferring the converted digital signal to said application specific integrated circuit;

encoding means connected to said application specific integrated circuit for generating a background video signal on the basis of digital read, green and blue signals, a digital color carrier signal and digital horizontal and vertical synchronization signals from said integrated circuit;

overlay means connected to said application specific integrated circuit for mixing a caption video signal from said integrated circuit with the background video signal from said encoding means in an overlay manner to express them as one image;

synchronization output means for selectively outputting a main clock signal of 21.47727 MHz or 22.168095 MHz according to an NTSC or PAL broadcasting system in response to an external synchronization signal;

internal video transmitter/receiver means for receiving a caption/background-mixed video signal from said overlay means and transmitting the received video signal as an internal video signal through an internal video transmission/reception antenna at a radio frequency controlled by a first frequency controller, said internal video transmitter/receiver means being further adapted to receive a radio frequency signal through said internal video transmission/reception antenna, convert the received radio frequency signal into an intermediate frequency signal, detect an external video signal from the converted intermediate frequency signal and output the detected video signal to said application specific integrated circuit; and external video transmitter/receiver means for receiving a background video signal from a video reproduction unit and transmitting the received video signal as said external video signal to said internal video transmitter/receiver means through an external video transmission/reception antenna at a radio frequency controlled by a second frequency controller, said external video transmitter/receiver means being further adapted to receive a radio frequency signal from said internal video transmitter/receiver means through said external video transmission/reception antenna, convert the received radio frequency signal into an intermediate frequency signal, detect said internal video signal from the converted intermediate frequency signal and output the detected video signal to a television.

2. A portable karaoke device as set forth in claim 1, further comprising video signal processing means including:

synchronization detection means for detecting said external synchronization signal from said external video signal from said external video transmitter/receiver means, said synchronization detection means including a transistor, a first inverter, a first resistor and a first capacitor;

synchronization discrimination means for comparing a synchronization signal from said application specific integrated circuit with said external synchronization signal detected by said synchronization detection means, said synchronization discrimination means including a second inverter, first and second diodes, second to fourth resistors and a second capacitor;

said overlay means including a video switch for receiving said external video signal from said external video transmitter/receiver means or said video signal from said encoding means as a background video signal and said caption video signal from said application specific integrated circuit and alternately selecting the received video signals to mix them in an overlay manner and express them as one image;

said encoding means generating said background video signal on the basis of said digital red, green and blue signals, digital color carrier signal and digital horizontal and vertical synchronization signals from said application specific integrated circuit and outputting the generated video signal to said overlay means;

clock generation means for generating a clock signal associated with said external video signal from said external video transmitter/receiver means according to whether said external video signal is an NTSC-type broadcasting signal of 3.59745 MHz or a PAL-type broadcasting signal of 4.447619 MHz, said clock generation means including first and second oscillators and first to third NAND gates;

an analog switch for selecting one of PAL, NTSC, external video and internal video modes under the control of said application specific integrated circuit based on a user's selection; and said synchronization output means outputting a synchronization signal corresponding to the mode selected by said analog switch to said application specific integrated circuit.

3. A portable karaoke device as set forth in claim 1, wherein said receiver means includes:

a filter for receiving said audio and data signals from said auxiliary microphone through said reception antenna and filtering the received signals;

first amplification means for amplifying an output signal from said filter;

a local oscillator for generating a local oscillating frequency;

a frequency converter for converting an output signal from said first amplification means into an intermediate frequency signal of 10.7 MHz by wired-ORing it with said local oscillating frequency from said local oscillator;

demodulation means for demodulating said intermediate frequency signal from said frequency converter to separate the original signal from a carrier, said demodulation means including a resistor, a coil and first and second capacitors;

a separator for separating the original signal from said demodulation means into the original audio signal and data signal;

second amplification means for amplifying the original audio signal from said separator and transferring the amplified audio signal to said amplifier/limiter means, said second amplification means including first and second operational amplifiers; and third amplification means for amplifying the original data signal from said separator and transferring the amplified data signal to said application specific integrated circuit via said data processor, said third amplification means including third and fourth operational amplifiers.

4. A portable karaoke device as set forth in claim 1, wherein said internal video transmitter/receiver means includes:

transmission/reception means for receiving said radio frequency signal from said external video transmitter/receiver means through said internal video transmission/reception antenna;

first amplification means for amplifying said radio frequency signal received by said transmission/reception means, said first amplification means including first and second resistors, first and second capacitors, a first coil and a first transistor;

second amplification means for amplifying an output signal from said first amplification means to compensate it for a transmission loss;

a local oscillator for generating a local oscillating frequency;

a detector for converting an output signal from said second amplification means into an intermediate frequency signal by wired-ORing it with said local oscillating frequency from said local oscillator, detecting said external video signal from the converted intermediate frequency signal and transferring the detected video signal to said application specific integrated circuit;

frequency generation means for generating a frequency of said caption/background-mixed video signal from said overlay means under the control of said first frequency controller, said frequency generation means including third and fourth resistors, second and third coils, third and fourth capacitors and a second transistor;

stereo means for mixing left and right stereo signals from said analog-digital/digital-analog converter into a stereo audio signal;

third amplification means for two-step amplifying the stereo audio signal from said stereo means, said third amplification means including third and fourth transistors;

fourth amplification means for two-step amplifying said caption/background-mixed video signal with the frequency generated by said frequency generation means and wired-ORing the amplified video signal with the stereo audio signal amplified by said third amplification means to mix them, said fourth amplification means including fifth and sixth transistors; and filtering means for filtering the stereo audio/video-mixed signal from said fourth amplification means and transmitting the resultant radio frequency signal through said internal video transmission/reception antenna, said filtering means including fifth and sixth capacitors and a fourth coil.

5. A portable karaoke device as set forth in claim 1, wherein said external video transmitter/receiver means includes:

transmission/reception means for receiving said radio frequency signal from said internal video transmitter/receiver means through said external video transmission/reception antenna;

first amplification means for amplifying said radio frequency signal received by said transmission/reception means, said first amplification means including first and second resistors, first and second capacitors, a first coil and a first transistor;

second amplification means for amplifying an output signal from said first amplification means;

a local oscillator for generating a local oscillating frequency;

a detector for converting an output signal from said second amplification means into an intermediate frequency signal by wired-ORing it with said local oscillating frequency from said local oscillator and detecting a stereo audio/video-mixed signal from the converted intermediate frequency signal;

a demodulator for demodulating the stereo audio/video-mixed signal detected by said detector to separate it into a stereo audio signal and a video signal;

third amplification means for amplifying a left stereo signal of the stereo audio signal from said demodulator and outputting the amplified left stereo signal to said television through a left audio output terminal, said third amplification means including a first operational amplifier;

fourth amplification means for amplifying a right stereo signal of the stereo audio signal from said demodulator and outputting the amplified right stereo signal to said television through a right audio output terminal, said fourth amplification means including a second operational amplifier;

fifth amplification means for amplifying the video signal from said demodulator and outputting the amplified video signal to said television through a video output terminal;

frequency generation means for generating a frequency of said background video signal from said video reproduction unit under the control of said second frequency controller, said frequency generation means including third and fourth resistors, second and third coils, third and fourth capacitors and a second transistor;

sixth amplification means for two-step amplifying said background video signal with the frequency generated by said frequency generation means, said sixth amplification means including third and fourth transistors; and filtering means for filtering said background video signal amplified by said sixth amplification means and transmitting the resultant radio frequency signal through said external video transmission/reception antenna, said filtering means including fifth and sixth capacitors and a fourth coil.

6. A portable karaoke device as set forth in claim 1, wherein said auxiliary microphone includes:

input means for inputting a user's song voice and outputting a corresponding audio signal;

first amplification means for amplifying the audio signal from said input means, said first amplification means including a first operational amplifier;

noise removing means for removing a noise component from the audio signal amplified by said first amplification means, said noise removing means including second and third operational amplifiers, first to third NAND gates, first to sixth resistors and first and second capacitors;

second amplification means for amplifying the noise-removed audio signal from said noise removing means, said second amplification means including a first inverter, a seventh resistor and a first oscillator;

a key matrix having a tune selection button having numeral keys of 0 to 9, up/down buttons, a reset button, a continuous play button, a start button, a stop button and a power button;

a key matrix controller for recognizing an item selected through said key matrix by the user and generating a corresponding data signal;

third amplification means for amplifying the data signal from said key matrix controller, said third amplification means including a second inverter, an eighth resistor and a second oscillator;

audio/data mixing means for mixing the audio signal and data signal amplified respectively by said second and third amplification means, said audio/data mixing means including ninth and tenth resistors, a first transistor, third and fourth capacitors and third and fourth inverters;

frequency generation means for generating a frequency of the audio/data-mixed signal from said audio/data mixing means under the control of a third frequency controller, said frequency generation means including eleventh and twelfth resistors, first and second coils, fifth and sixth capacitors and a second transistor; and fourth amplification means for two-step amplifying said audio/data-mixed signal with the frequency generated by said frequency generation means and transmitting the resultant radio frequency signal through said transmission antenna, said fourth amplification means including third and fourth transistors.

* * * * *